United States Patent
Mader

(10) Patent No.: US 10,515,658 B1
(45) Date of Patent: Dec. 24, 2019

(54) LASER CALIBRATION USING TEMPERATURE COMPENSATION EQUATION FOR HEAT-ASSISTED MAGNETIC RECORDING DEVICE

(71) Applicant: Seagate Technology LL, Cupertino, CA (US)

(72) Inventor: Drew Michael Mader, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/151,910

(22) Filed: Oct. 4, 2018

(51) Int. Cl.
| | |
|---|---|
| *G11B 11/105* | (2006.01) |
| *G11B 5/012* | (2006.01) |
| *G11B 13/04* | (2006.01) |
| G11B 5/00 | (2006.01) |
| G11B 7/1267 | (2012.01) |
| G11B 7/1263 | (2012.01) |
| G11B 7/126 | (2012.01) |

(52) U.S. Cl.
CPC ............ *G11B 5/012* (2013.01); *G11B 13/045* (2013.01); *G11B 7/126* (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | |
|---|---|---|
| 7,095,577 B1 | 8/2006 | Codilian et al. |
| 8,320,070 B2 | 11/2012 | Yoshida |
| 9,042,207 B2* | 5/2015 | Dakroub ............... G11B 5/314 |
| | | 369/13.26 |
| 9,236,081 B1 | 1/2016 | Chu et al. |
| 9,502,061 B1 | 11/2016 | Zhu et al. |

(Continued)

OTHER PUBLICATIONS

Chu et al., U.S. Appl. No. 16/170,445, filed Oct. 25, 2018.

*Primary Examiner* — Tan X Dinh
(74) *Attorney, Agent, or Firm* — Mueting, Raasch & Gebhardt, P.A.

(57) ABSTRACT

A method includes generating, during manufacture of a heat-assisted magnetic recording (HAMR) disk drive, a temperature compensation equation for a compensation factor using initial operating currents supplied to a laser diode of the disk drive at different initial operating temperatures and an efficiency value based on the initial operating temperatures. The operating currents are representative of currents for recording data to or erasing data from a magnetic recording medium. The temperature compensation equation is stored in the disk drive. A subsequent efficiency value is determined based on at least one of the initial operating temperatures and an operating temperature differing from the initial operating temperatures. An updated compensation factor at the operating temperature is determined during field operation using the temperature compensation equation and the subsequent efficiency value. An updated operating current is calculated using the updated compensation factor and the operating temperature. A current supplied to the laser diode for a subsequent write operation is adjusted to the updated operating current.

20 Claims, 9 Drawing Sheets

(56) References Cited

U.S. PATENT DOCUMENTS

| | | | |
|---|---|---|---|
| 9,704,529 B1 | 7/2017 | Lou et al. | |
| 10,127,930 B1* | 11/2018 | Chu | G11B 5/02 |
| | | | 369/13.26 |
| 2013/0077453 A1 | 3/2013 | Alex | |
| 2014/0119164 A1* | 5/2014 | Wilson | G11B 5/314 |
| | | | 369/13.26 |
| 2016/0104514 A1 | 4/2016 | Burnett et al. | |

* cited by examiner

LASER CALIBRATION USING TEMPERATURE COMPENSATION EQUATION FOR HEAT-ASSISTED MAGNETIC RECORDING DEVICE

SUMMARY

Embodiments described herein are directed to a method comprising generating, during manufacture of a heat-assisted magnetic recording (HAMR) disk drive, a temperature compensation equation for a compensation factor using initial operating currents supplied to a laser diode of the disk drive at different initial operating temperatures and an efficiency value based on the initial operating temperatures. The operating currents are representative of currents for recording data to or erasing data from a magnetic recording medium. The temperature compensation equation is stored in the disk drive. A subsequent efficiency value is determined based on at least one of the initial operating temperatures and an operating temperature differing from the initial operating temperatures. An updated compensation factor at the operating temperature is determined during field operation using the temperature compensation equation and the subsequent efficiency value. An updated operating current is calculated using the updated compensation factor and the operating temperature. A current supplied to the laser diode for a subsequent write operation is adjusted to the updated operating current.

Embodiments are directed to an apparatus comprising a slider of a heat-assisted magnetic recording (HAMR) disk drive movable relative to a magnetic recording medium. The slider comprises a writer, a reader, a near-field transducer, and an optical waveguide for communicating light from a laser diode to the near-field transducer. A temperature sensor is disposed in the disk drive and is configured to measure an operating temperature or a value proportional to the operating temperature. A controller of the disk drive is coupled to the slider and the temperature sensor. The controller is configured to generate, during manufacture of the disk drive, a temperature compensation equation for a compensation factor using initial operating currents supplied to a laser diode of the disk drive at different initial operating temperatures and an efficiency value based on the initial operating temperatures. The operating currents are representative of currents for recording data to or erasing data from the medium. The temperature compensation equation is stored in the disk drive. The controller is configured to determine a subsequent efficiency value using at least one of the initial operating temperatures and the operating temperature or the value proportional to the operating temperature. An updated compensation factor at the operating temperature is determined during field operation using the temperature compensation equation and the subsequent efficiency factor. An updated operating current is calculated using the updated compensation factor. A current supplied to the laser is adjusted for a subsequent write operation to the updated operating current.

Embodiments are directed to a method comprising generating, during manufacture of a heat-assisted magnetic recording (HAMR) disk drive, a linear temperature compensation equation for a compensation factor using initial operating currents supplied to a laser diode of the disk drive at different initial operating temperatures and an efficiency value based on the initial operating temperatures. The operating currents are representative of currents for recording data to or erasing data from the medium. The compensation factor is proportional to a slope of light output versus a current supplied to the laser diode. The temperature compensation equation is stored in the disk drive. A subsequent efficiency value is determined based on at least one of the initial operating temperatures and an operating temperature differing from the initial operating temperatures. An updated compensation factor at the operating temperature is determined during field operation using the temperature compensation equation and the subsequent efficiency factor. An updated operating current is calculated using the updated compensation factor and the operating temperature. A current supplied to the laser diode for a subsequent write operation is adjusted to the updated operating current.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature having dimensions less than 100 nm (e.g., ~50 nm).

Figure 1:
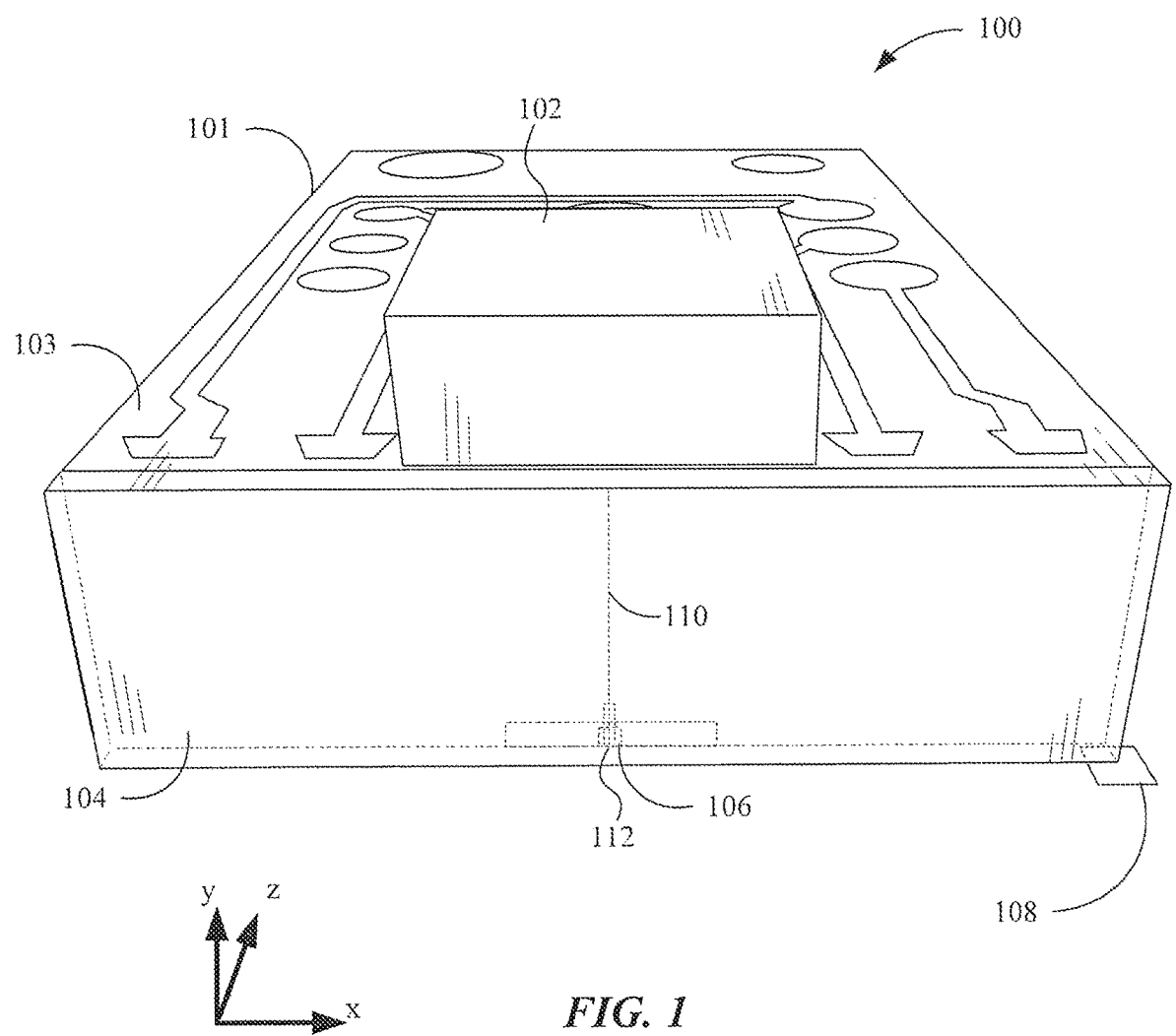
FIG. 1 is a perspective view of a hard drive slider configured for heat-assisted magnetic recording (HAMR) in accordance with embodiments described herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
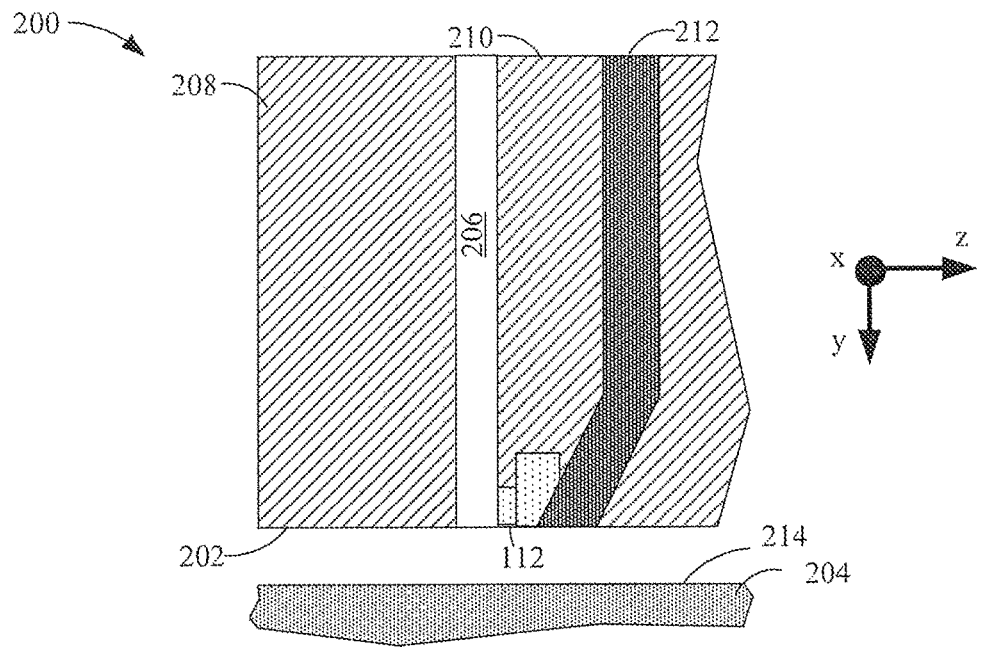
FIG. 2 is a cross-sectional view showing details of a HAMR slider according to various implementations.

With reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core 206 is surrounded by cladding layers 208, 210. The waveguide core 206 and cladding layers 208, 210 may be made from dielectric materials. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a write pole 212 of the read/write head that is located alongside the NFT 112. The write pole 212 generates a magnetic field (e.g., perpendicular field) used in changing the magnetic orientation of the hotspot during writing.

Figure 3:
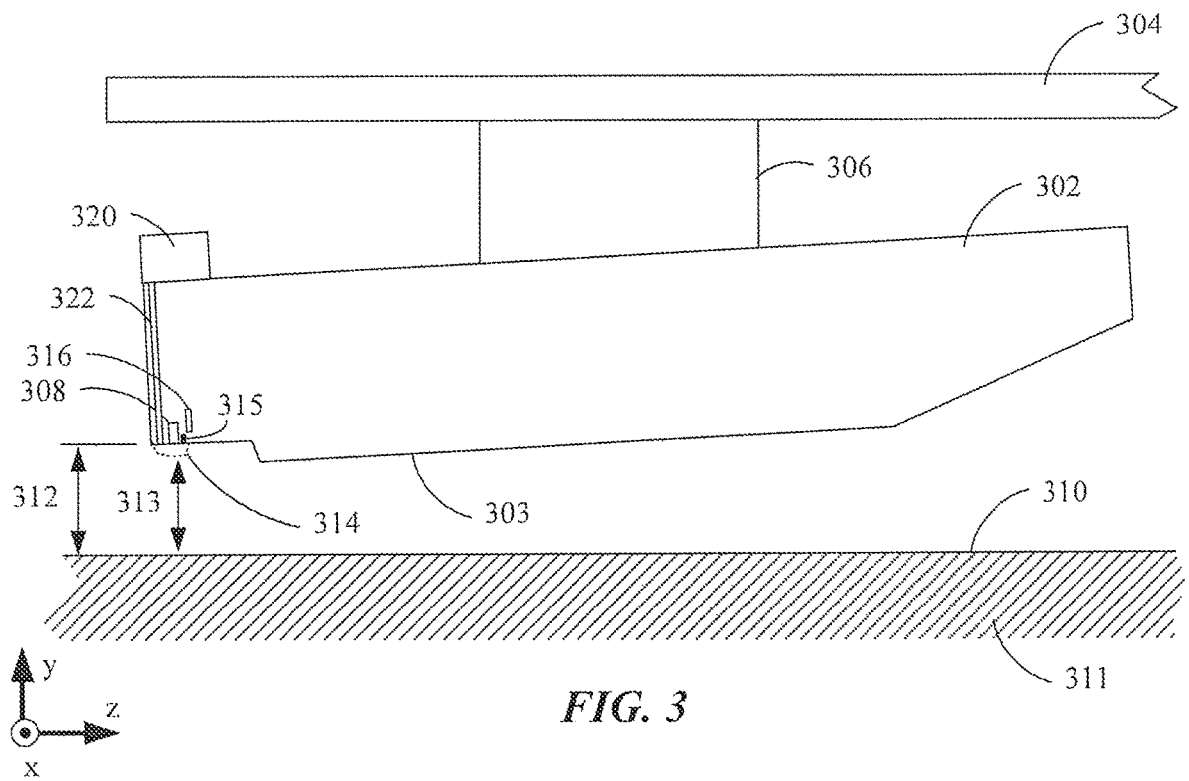
FIG. 3 illustrates a HAMR slider in accordance with some aspects described herein.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read/write head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via one or more heaters 316. A thermal sensor 315 is shown situated at or near the close point 314 (e.g., adjacent the read/write transducers 308, such as near the near-field transducer) or can be positioned at other location of the ABS 303.

Figure 4:
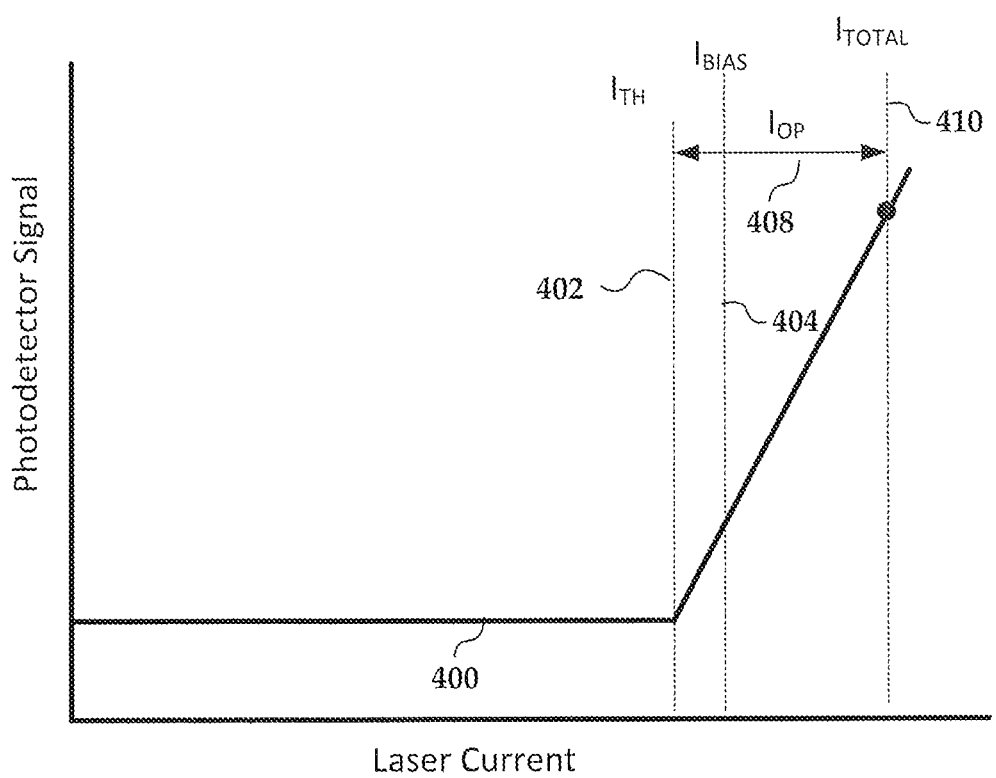
FIG. 4 is a generalized graph characterizing output optical power of a laser diode of a HAMR slider in response to current supplied to the laser diode.

Turning now to FIG. 4, a generalized graph characterizing output optical power of a laser diode of a HAMR slider (e.g., as measured by a photodiode) in response to current supplied to the laser diode is illustrated. The laser diode is in a non-conducting state until a threshold current, $I_{TH}$, 402 is reached. At $I_{TH}$ 402, the laser diode begins to lase. When recording data on a magnetic recording medium, the current supplied to the laser diode is increased to $I_{TOTAL}$ 410 by $I_{OP}$ 408 (referred to as operational current). At $I_{TOTAL}$ ($I_{TH}+I_{OP}$) 410, the current supplied to the laser diode is sufficient to facilitate an increase in media temperature to the Curie temperature for recording data on the medium. A current $I_{BIAS}$ 404 represents a current supplied to the laser diode that is lower than $I_{TOTAL}$ 410. At $I_{BIAS}$ 404, the current supplied to the laser diode (bias current) is not sufficient to facilitate recording of data. $I_{BIAS}$ 404 is typically set between $I_{TOTAL}$ 410 and $I_{TH}$ 402, but can also be set lower than $I_{TH}$ 402 (not shown). The laser diode current is set at $I_{BIAS}$ 404 prior to performing a write or when performing various non-recording tasks, such as when performing a seek or when the slider is over servo wedges between writes.

Figure 5:
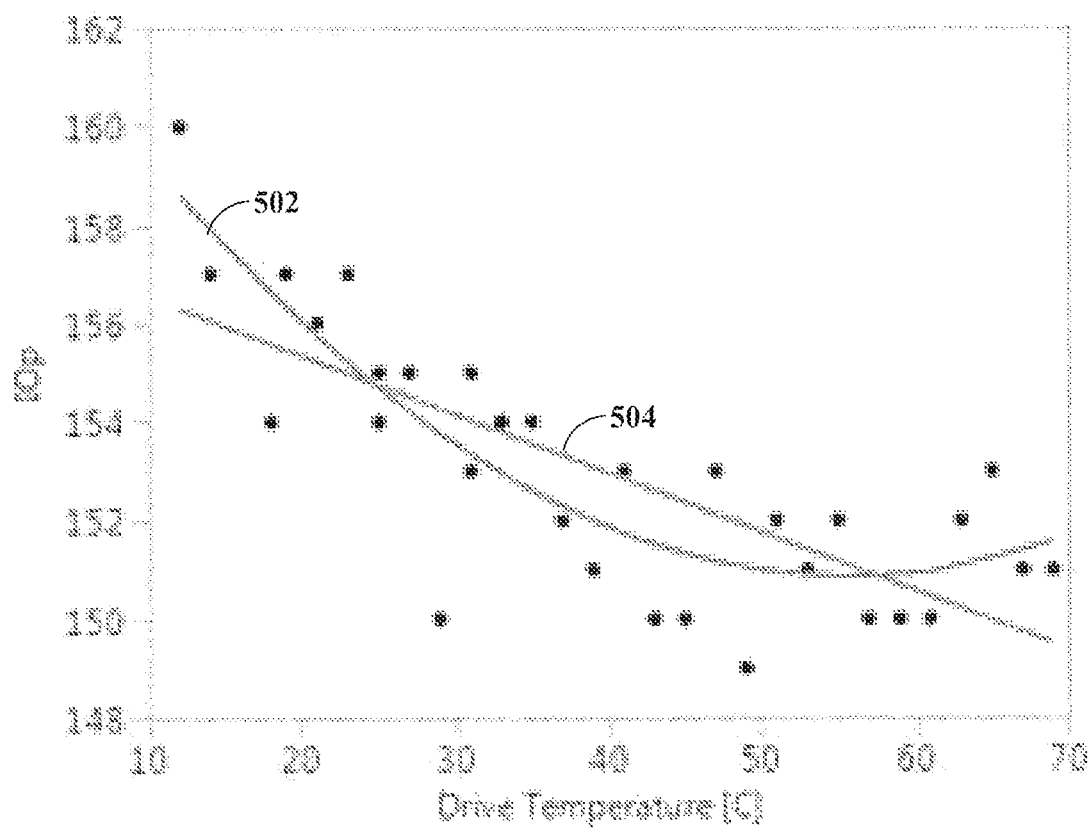
FIG. 5 is a graph showing how the operating current supplied to a laser diode of a HAMR slider changes non-linearly across temperature in accordance with embodiments described herein.

It is been found that the laser diode current $I_{OP}$ is non-linear across temperature. FIG. 5 is a graph showing how $I_{OP}$ 502 changes non-linearly across temperature. The magnitude of the $I_{OP}$ non-linearity increases at the extremes (low and high) of the temperature range. FIG. 5 also shows a straight-line average $I_{OP}$ 504 derived from performing a linear regression on the $I_{OP}$ data points. It can be appreciated that using the straight-line average $I_{OP}$ 504 to set $I_{OP}$ of the laser diode at a given operating temperature would result in a suboptimal current supplied to the laser diode for recording.

Figure 6:
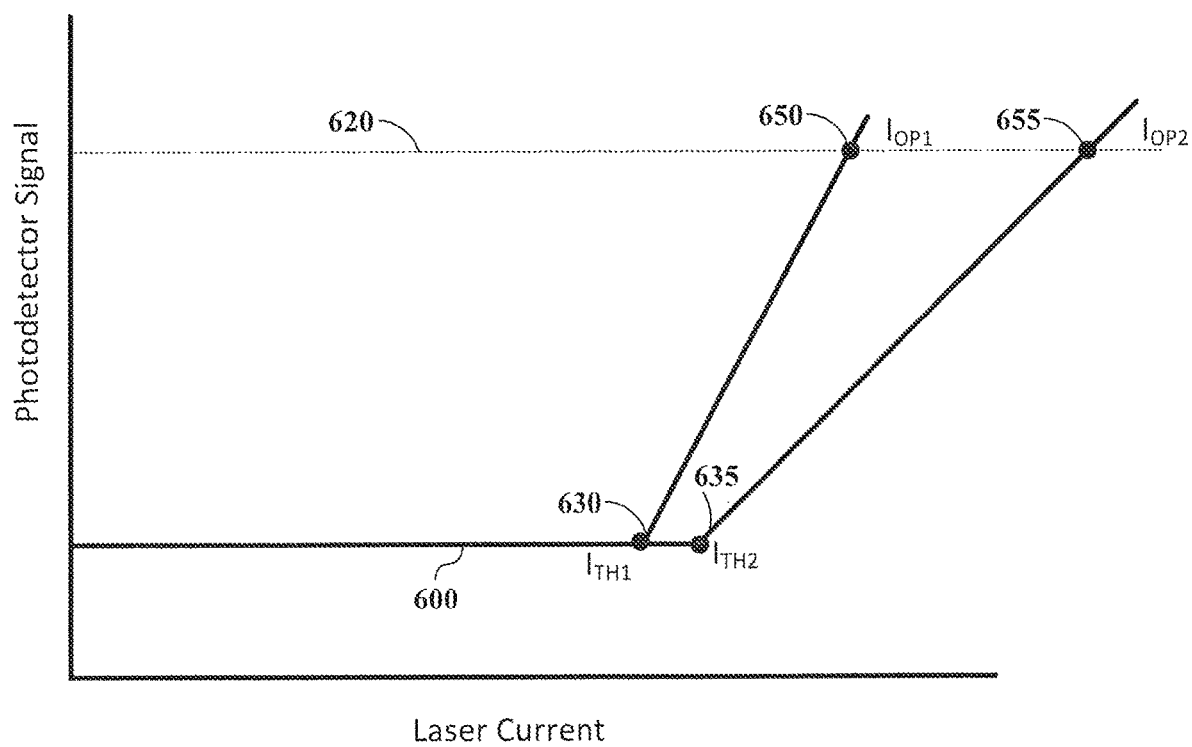
FIG. 6 illustrates example efficiency slopes for two different temperatures in accordance with various embodiments.

According to various embodiments described herein, the efficiency of a laser diode may be based on the temperature of the laser. For example, a laser at a relatively cold temperature may output more light at a current above $I_{TH}$ than a laser at a relatively hot temperature. The laser efficiency at a given temperature can be determined by calculating the slope of the photodetector output versus the laser current between the threshold current and the $I_{OP}$ needed to reach the Curie temperature. FIG. 6 illustrates example slopes for two different temperatures. At a first temperature, the threshold current ($I_{TH1}$) 630 is reached at a first laser current. The slope of the line between $I_{TH1}$ 630 and the $I_{OP1}$ 650 needed to reach the Curie Temperature 620 represents the efficiency of the laser at the first temperature. At a second temperature, the threshold current ($I_{TH2}$) 635 is reached at a second laser current that is different from the first laser current. In this case, $I_{TH2}$ 635 is greater than $I_{TH1}$ 630 and the second temperature is greater than the first temperature. The slope of the line between $I_{TH2}$ and the $I_{OP2}$ 655 needed to reach the Curie Temperature 620 represents the efficiency of the laser at the second temperature. Creating a compensation equation that is based on the slope of the photodetector signal versus the laser current may be useful in creating a more accurate temperature compensation than with extrapolated $I_{OP}$ values using linear regression. According to various embodiments, the compensation equation is based on a signal other than a photodetector signal. For example, a thermal sensor may be used to measure a heat value that is proportional to the light output.

Embodiments of the disclosure are directed to generating a temperature compensated $I_{OP}$ ($I_{OP}A$) supplied to a laser diode of a HAMR slider across a range of operating temperatures of the disk drive. According to various configurations described herein, the operating temperature comprises one or more of a temperature of the disk drive, a temperature of the laser diode, and a temperature of the medium. An initial temperature compensation equation characterizing $I_{OP}$ at different temperatures is typically established at the time of disk drive manufacture for a minimal number (e.g., 2) of operating temperatures. The temperature compensation for selecting $I_{OP}$ may be updated during field operation of the HAMR disk drive. For example, the temperature compensation can be updated during field operation in response to a difference between the current operating temperature and previous operating temperatures within a temperature range. While embodiments described herein generally discuss using two initial operating temperatures, it is to be understood that a different number of initial operating temperatures may be used. For example, three or four initial operating temperatures may be used.

Limiting the number of operating temperatures when generating the initial temperature compensation equation in the factory is important from a manufacturing cost/time standpoint. Developing a temperature compensation of $I_{OP}$ during manufacturing using multi-temperature testing across a wide range of operating temperatures is very expensive and time consuming. Also, conventional production equipment has a limited temperature range which is significantly smaller than the operating temperature range specified for disk drive product. As such, it is not presently possible to develop, at the time of disk drive manufacture, a temperature compensation equation for characterizing $I_{OP}$ across the full range of operating temperatures specified for HAMR disk drive product. Because the temperature compensation equation is updated in the field according to embodiments of the disclosure, $I_{OP}$ can be characterized across the full range of operating temperatures experienced by the disk drive.

According to various embodiments described herein, a laser efficiency value is calculated by using various methods in a factory process such as using output from a thermal sensor, and/or a photodetector, for example. For example, the laser efficiency value may be calculated using initial temperatures in the factory and then extrapolated to other temperatures using an equation based on the initial temperatures. The equation based on the initial temperatures may be linear or nonlinear. For example, in an embodiment in which there are two initial temperatures, the equation will be linear. If more than two temperatures are used, the equation may be linear or nonlinear. In an embodiment in which there are two initial temperatures, a third data point could be supplied based on data not run in the manufacturing environment. This third data point could be used to accurately fit a nonlinear curve. In some cases, the laser efficiency is calculated in the field using the signal from the thermal sensor and/or the photodetector. The laser efficiency values may be normalized to one reference temperature. For example, the laser efficiency value can be normalized to 50° C. and all other efficiency values can be scaled relative to that value. The Iop value according to the original linear temperature compensation equation is multiplied by its respective scaled efficiency value to get the Adjusted $I_{OP}$ value, referred to herein as $I_{OP}A$ and/or a compensation factor, as illustrated by Equation 1 below. In this example, $I_{OP}A(T)$ is the adjusted $I_{OP}$ value at temperature T, $I_{OP}(T)$ is the $I_{OP}$ value at T, Eff is the laser efficiency at T, and Eff(T=N) is the laser efficiency at temperature T=N.

$$I_{OP}A(T) = I_{OP}(T) * \frac{Eff(T)}{Eff(T=N)} \qquad \text{Equation 1}$$

Table 1 illustrates an example calculation for $I_{OP}A$ performed in the field. The first two rows for initial temperatures 20° C. and 50° C. are measured in the factory process. The values of $I_{OP}A$ at 20° C. and 50° C. are calculated using $I_{OP}$, the efficiency at the initial temperatures, and the efficiency at temperature N. N may be the highest temperature of the initial temperatures. For example, N may be about 50° C.

TABLE 1

| Temperature | Laser Efficiency | $I_{OP}$ | $I_{OP}A$ |
|---|---|---|---|
| 20 | 1.3 | 120 | 156 |
| 50 | 1.0 | 100 | 100 |
| 80 | 0.7 | 63 | 44 |

Figure 7:
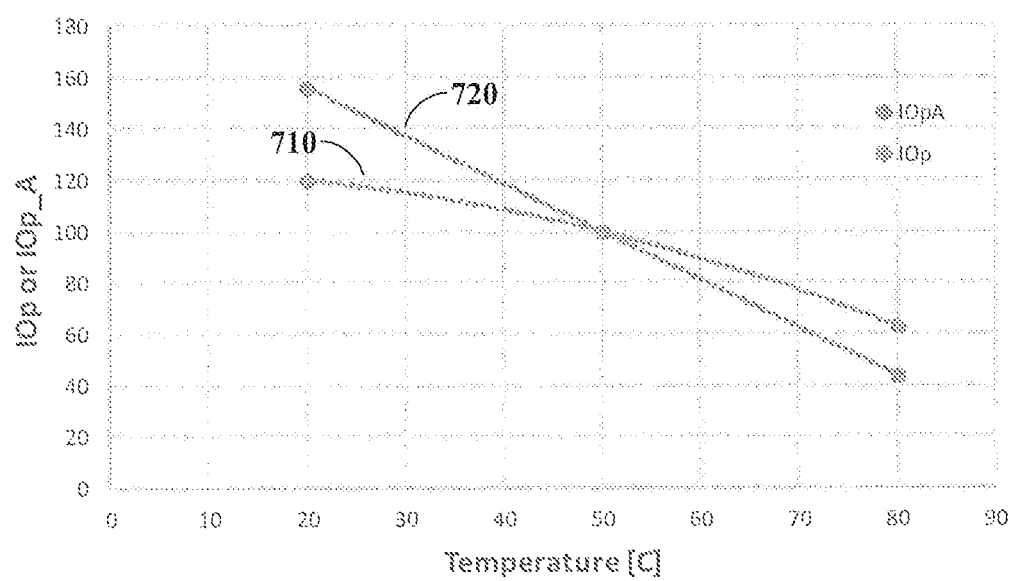
FIGS. 7 and 8 show graphs of $I_{OP}$ and $I_{OP}A$ versus temperature in accordance with various embodiments described herein.

FIG. 7 illustrates $I_{OP}$ 710 and $I_{OP}A$ 720 versus temperature. A linear relationship 720 can be determined based on the two values of $I_{OP}A$ at 20° C. and 50° C. Equation 2 shows the calculation for $I_{OP}A$ at temperature T, where m represents the slope and b represents the y-intercept. In the example shown in FIG. 7, the slope is about −1.9 and the y-intercept is about 193.3. The slope and the y-intercept of Equation 2 can be used to calculate values of $I_{OP}A$ at temperatures different than the initial temperatures. For the last row in Table 1, a temperature of 80° C. is measured in the field. An $I_{OP}A$ value of about 44 is calculated using Equation 2 based on the measured temperature. The $I_{OP}$ value for 80° C. can then be calculated using Equation 1 where the laser efficiency is linear with temperature. In this case, the laser efficiency at 80° C. is about 0.7.

$$I_{OP}A(T) = mT + b \qquad \text{Equation 2}$$

Figure 8:
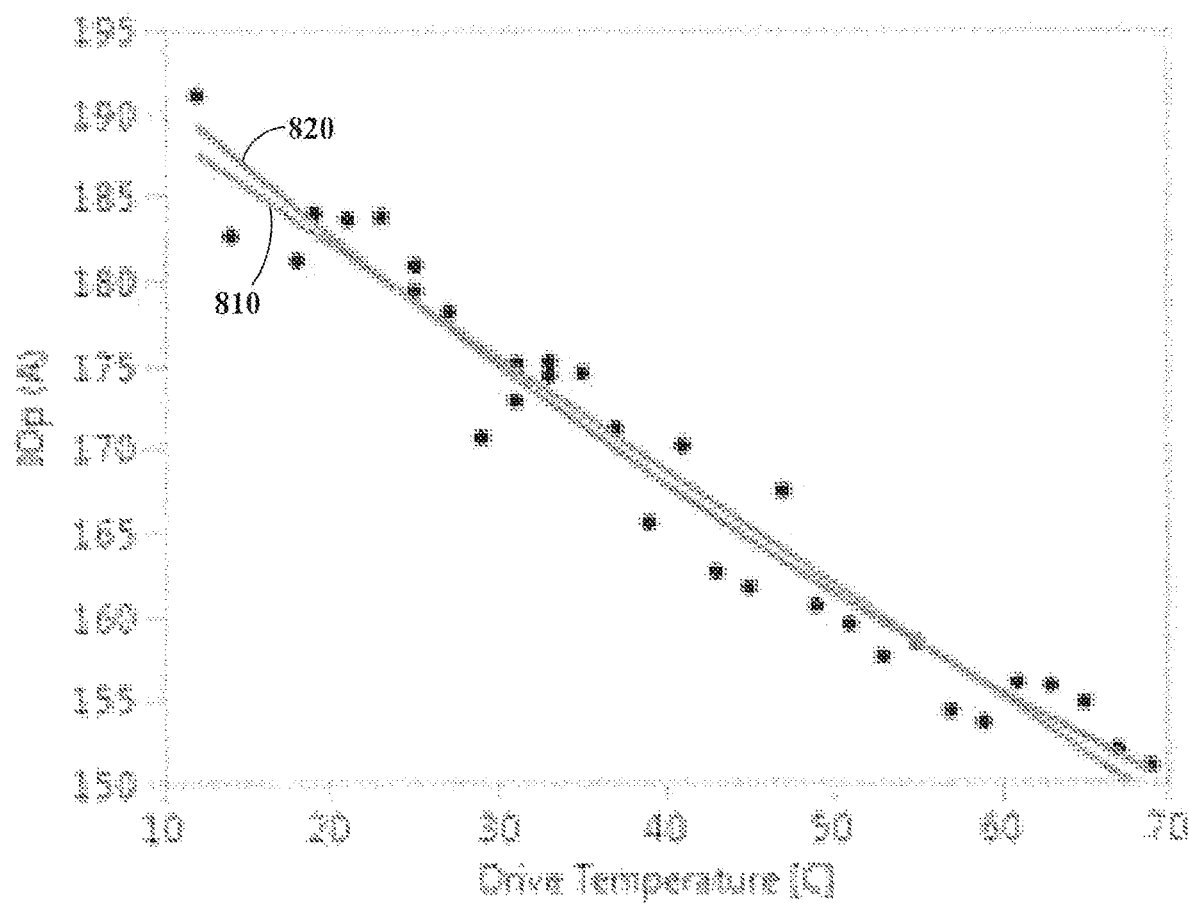

FIG. 8 illustrates $I_{OP}A$ as a function of temperature on the same head as shown in FIG. 5, it can be observed how the second order fit 810 and the linear fit 820 are more-or-less on top of each other indicating a better goodness of fit for this algorithm than compared to using a linear line for just $I_{OP}$. It may be desirable to have a linear extrapolation work for calibrating the laser due to the ability to only measure using two temperatures. This means that a linear extrapolation for $I_{OP}A$ yields much better results than with just $I_{OP}$.

Figure 9:
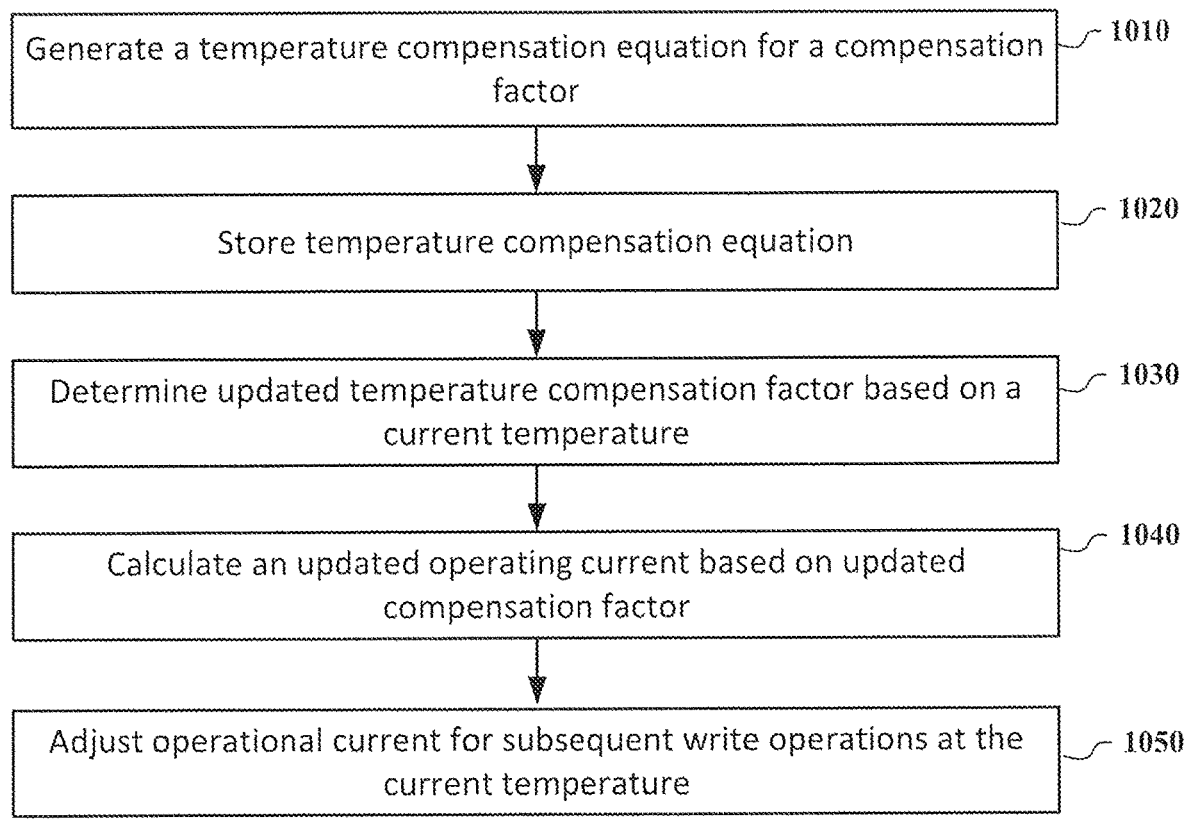
FIG. 9 illustrates a method of adjusting an operational current in the field in accordance with embodiments described herein.
Figure 10:
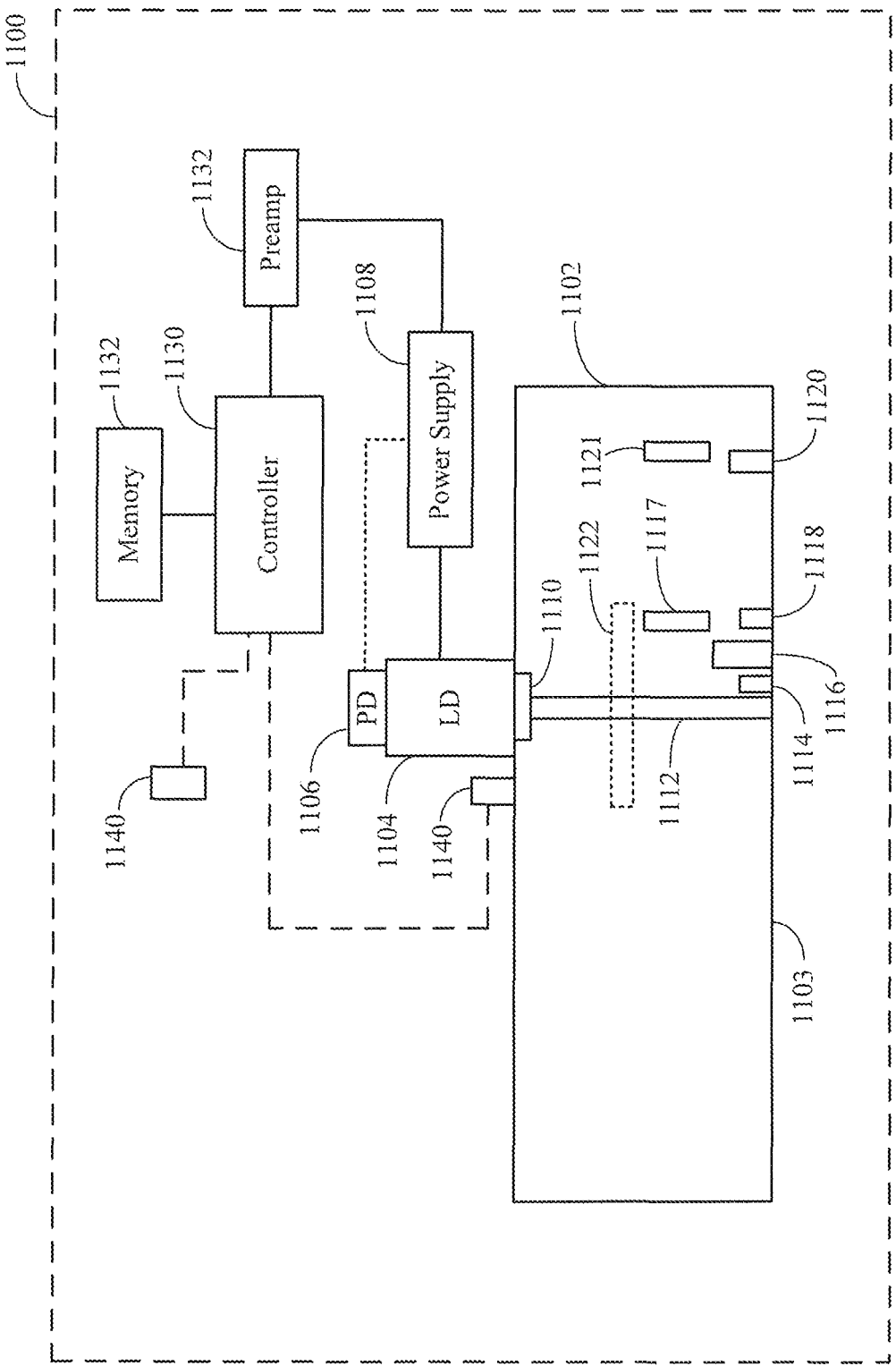
FIG. 10 is a block diagram of a system for calibrating a laser of a HAMR head using the efficiency of the laser at different temperatures in accordance with various embodiments described herein.

FIG. 9 illustrates a method of adjusting an operational current in the field in accordance with embodiments described herein. A temperature compensation equation for a compensation factor is generated 1010. According to various embodiments the temperature compensation equation is generated during manufacture of a HAMR disk drive. In some cases, the temperature compensation equation is a linear equation. The temperature compensation equation is generated using initial operating currents supplied to a laser diode of the disk drive at different initial operating temperatures and an efficiency value based on the initial operating temperatures. The operating currents may be representative of currents for recording data to or erasing data from the medium. According to various embodiments, the efficiency value is a slope of light output versus a current supplied to the laser diode. The light output may be determined by measuring light output from a photodetector, for example. In some cases, the light output is determined by measuring a value that is proportional to the light output. For example, heat that is generated by light may be measured by a thermal sensor. The light output is determined based on the amount of sensed heat. According to various embodiments, the laser efficiency value changes linearly with temperature. In some cases, the laser efficiency value changes nonlinearly with temperature or does not change with temperature.

The temperature compensation equation is stored 1020 in the disk drive. An updated compensation factor is determined 1030 using the temperature compensation equation and a subsequent efficiency factor with an operating temperature differing from the initial operating temperatures. According to various embodiments, the updated temperature compensation equation is determined during field operation of the disk drive. An updated operating current is calculated 1040 using the updated compensation factor. A current supplied to the drive is adjusted 1050 for a subsequent write operation at the operating temperature to the updated operating current. In some cases, the compensation factor is normalized using a predetermined temperature. For example, the compensation factor may be normalized to the highest temperature of the two different initial operating temperatures.

FIG. 11 is a block diagram of a system for calibrating a laser diode of a HAMR head using a temperature compensation equation methodology in accordance with various embodiments. FIG. 11 shows a portion of a HAMR drive 1100 which includes a slider 1102 upon which a laser diode 1104 is mounted. A photodetector 1106 can be mounted on or in close proximity to the laser diode 1104. A power supply 1108 is coupled to the laser diode 1104 and provides a supply current (e.g., $I_{TOTAL}$, $I_{BIAS}$) to the laser diode 1104. An output of the photodetector 1106 is coupled to the power supply 1108. The power supply 1108 can adjust the current supplied to the laser diode 1104 in response to the photodetector output.

The slider 1102 includes a number of components including an optical waveguide 1112 which is optically coupled to the laser diode 1104 via an optical coupler 1110. The optical waveguide 1112 extends from the optical coupler 1110 to an NFT 1114 situated at the air bearing surface 1103 proximate the optical waveguide 1112. In some embodiments, a bolometer 1122 is situated proximate the optical waveguide 1112. A writer 1116 is situated proximate the NFT 1114. A writer heater 1117 is situated proximate the writer 1116 and configured to thermally actuate the writer 1116 (e.g., writer pole/NFT). A contact sensor 1118 may be situated proximate the writer 1116 and NFT 1114 (e.g., at a close point of the writer). A reader 1120 is shown positioned away from the writer 1116 and contact sensor 1118. A reader heater 1121 is positioned proximate the reader 1120 and configured to thermally actuate the reader 1120. A temperature sensor 1140 (e.g., a thermistor or thermocouple) is provided in the HAMR drive 1100 to measure an operating temperature of the drive 1100 or a value proportional to the operating temperature. In some embodiments, the temperature sensor 1140 is positioned close to the laser diode 1104 or the slider 1102. In other embodiments, the temperature sensor 1140 is positioned away from the slider 1102 but within the enclosure of the drive 1100.

The HAMR drive 1100 further includes a controller 1130 (e.g., microprocessor or microcontroller) coupled to a non-volatile memory 1132. A temperature compensation equation can be stored in the memory 1132, as well as data associated with ILPT processes. The controller 1130 is configured to implement the ILPT processes and update the temperature compensation equation in a manner discussed hereinabove. For example, the controller 1130 is configured to implement executable instructions corresponding to the flow charts and other figures discussed hereinabove.

The power supply 1108 is also coupled to a preamplifier 1132. The preamplifier 1132 can provide the power supply 1108 with signals corresponding to $I_{TOTAL}$ values for setting the total current supplied to the laser diode 1104 during write operations in accordance with the temperature compensation equation.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    generating, during manufacture of a heat-assisted magnetic recording (HAMR) disk drive, a temperature compensation equation for a compensation factor using initial operating currents supplied to a laser diode of the disk drive at different initial operating temperatures and an efficiency value based on the initial operating temperatures, the operating currents representative of currents for recording data to or erasing data from a magnetic recording medium;
    storing the temperature compensation equation in the disk drive;
    determining a subsequent efficiency value based on at least one of the initial operating temperatures and an operating temperature differing from the initial operating temperatures;
    determining, during field operation, an updated compensation factor at the operating temperature using the temperature compensation equation and the subsequent efficiency value;
    calculating an updated operating current using the updated compensation factor and the operating temperature; and
    adjusting a current supplied to the laser diode for a subsequent write operation to the updated operating current.

2. The method of claim 1, further comprising normalizing the compensation factor using a predetermined temperature.

3. The method of claim 2, wherein the temperature compensation equation is linear.

4. The method of claim 2, wherein the different initial operating temperatures comprise two different initial operating temperatures.

5. The method of claim 4, wherein the predetermined temperature is the highest temperature value of the two different initial operating temperatures.

6. The method of claim 1, wherein the laser efficiency value is proportional to a slope of light output versus a current supplied to the laser diode.

7. The method of claim 1, wherein the operating temperature comprises one or more of a temperature of the disk drive, a temperature of the laser diode, and a temperature of the magnetic recording medium.

8. An apparatus, comprising:
    a slider of a heat-assisted magnetic recording (HAMR) disk drive movable relative to a magnetic recording medium, the slider comprising a writer, a reader, a near-field transducer, and an optical waveguide for communicating light from a laser diode to the near-field transducer;
    a temperature sensor disposed in the disk drive and configured to measure an operating temperature or a value proportional to the operating temperature; and
    a controller of the disk drive coupled to the slider and the temperature sensor, the controller configured to:
        generate, during manufacture of the disk drive, a temperature compensation equation for a compensation factor using initial operating currents supplied to a laser diode of the disk drive at different initial operating temperatures and an efficiency value based on the initial operating temperatures, the operating currents representative of currents for recording data to or erasing data from the medium;
        store the temperature compensation equation in the disk drive;

determine a subsequent efficiency value using at least one of the initial operating temperatures and the operating temperature or the value proportional to the operating temperature;

determine, during field operation, an updated compensation factor at the operating temperature using the temperature compensation equation and the subsequent efficiency value;

calculate an updated operating current using the updated compensation factor; and adjust a current supplied to the laser diode for a subsequent write operation to the updated operating current.

9. The apparatus of claim 8, wherein the controller is configured to normalize the compensation factor using a predetermined temperature.

10. The apparatus of claim 9, wherein the temperature compensation equation is linear.

11. The apparatus of claim 9, wherein the different initial operating temperatures comprise two different initial operating temperatures.

12. The apparatus of claim 11, wherein the predetermined temperature is the highest temperature value of the two different initial operating temperatures.

13. The apparatus of claim 8, further comprising a photodetector configured to measure light output by the laser diode.

14. The apparatus of claim 13, wherein the laser efficiency value is proportional to a slope of light output versus a current supplied to the laser diode.

15. The apparatus of claim 8, wherein the operating temperature comprises one or more of a temperature of the disk drive, a temperature of the laser diode, and a temperature of the magnetic recording medium.

16. A method comprising:
generating, during manufacture of a heat-assisted magnetic recording (HAMR) disk drive, a linear temperature compensation equation for a compensation factor using initial operating currents supplied to a laser diode of the disk drive at different initial operating temperatures and an efficiency value based on the initial operating temperatures, the operating currents representative of currents for recording data to or erasing data from the medium, the compensation factor proportional to a slope of light output versus a current supplied to the laser diode;

storing the temperature compensation equation in the disk drive;

determining a subsequent efficiency value based on at least one of the initial operating temperatures and an operating temperature differing from the initial operating temperatures;

determining, during field operation, an updated compensation factor at the operating temperature using the temperature compensation equation and the subsequent efficiency value;

calculating an updated operating current using the updated compensation factor; and adjusting a current supplied to the laser diode for a subsequent write operation to the updated operating current.

17. The method of claim 16, further comprising normalizing the compensation factor using a predetermined temperature.

18. The method of claim 17, wherein the different initial operating temperatures comprise two different initial operating temperatures.

19. The method of claim 16, wherein the predetermined temperature is the highest temperature value of the two different initial operating temperatures.

20. The method of claim 16, wherein the operating temperature comprises one or more of a temperature of the disk drive, a temperature of the laser diode, and a temperature of the magnetic recording medium.

* * * * *